Oct. 27, 1964 E. L. WALINSKI 3,154,616
METHOD FOR MOLDING FLUID SEALS
Filed Oct. 5, 1961 2 Sheets-Sheet 1
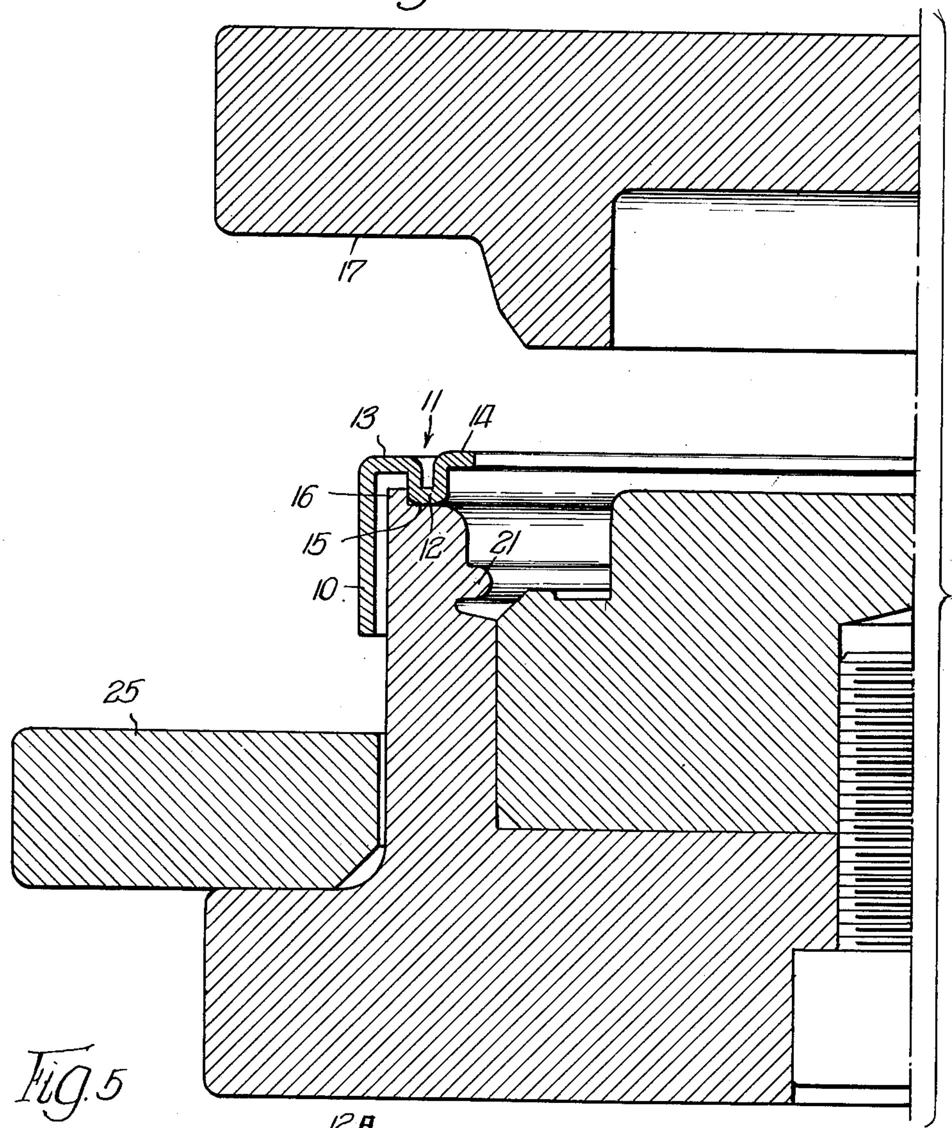
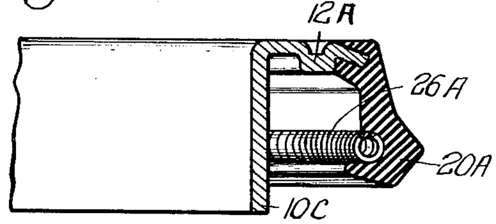
INVENTOR.
Edward L. Walinski
BY George H. Simmons
Atty Oct. 27, 1964 E. L. WALINSKI 3,154,616
METHOD FOR MOLDING FLUID SEALS
Filed Oct. 5, 1961 2 Sheets-Sheet 2
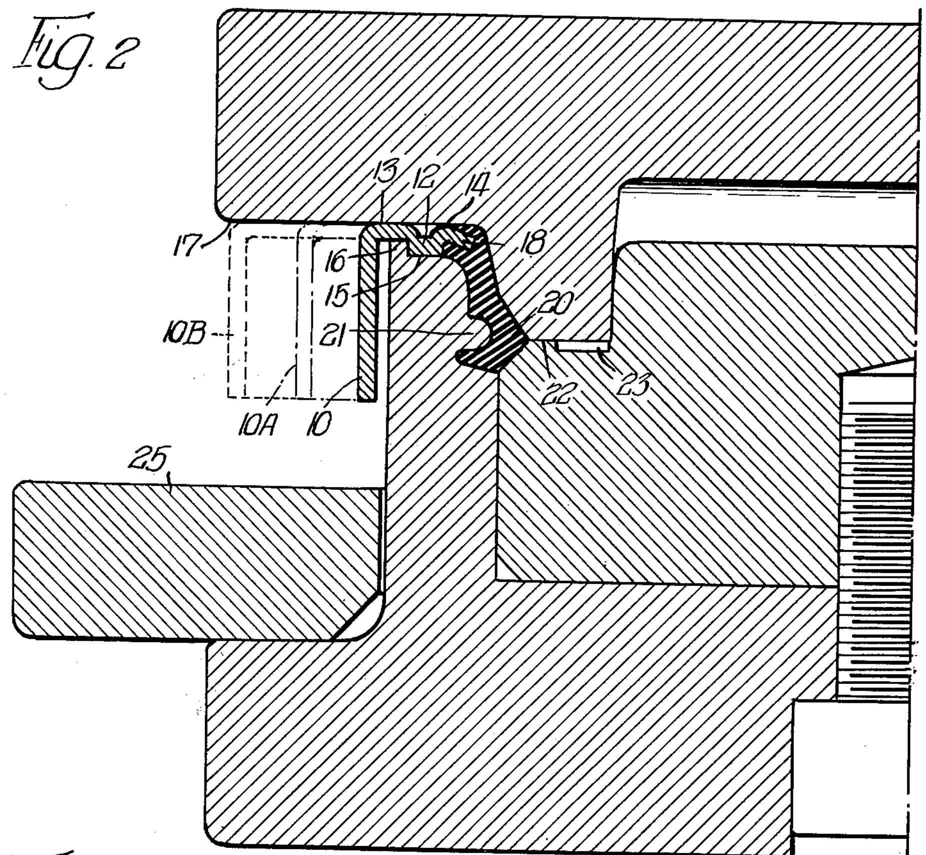
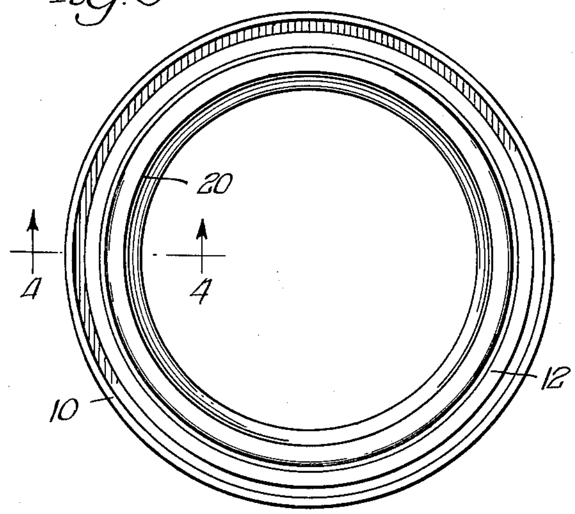
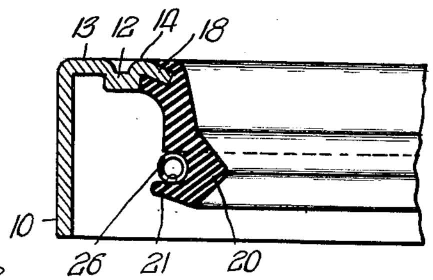
INVENTOR.
Edward L. Walinski
BY George H. Simmons
Atty.

United States Patent Office 3,154,616

Patented Oct. 27, 1964

3,154,616

METHOD FOR MOLDING FLUID SEALS

Edward L. Walinski, Des Plaines, Ill., assignor to Victor Manufacturing & Gasket Company, Chicago, Ill., a corporation of Illinois Filed Oct. 5, 1961, Ser. No. 143,196
3 Claims. (Cl. 264—266)

This invention relates to a method of making fluid sealing devices and to the devices thereby made.

The main object of the invention is to provide a method of molding elastomer sealing elements and bonding the same onto the end wall of a metallic shell, which method enables a mold to function with shells whose cylindrical walls are of diameters that vary over a wide range.

Another object of the invention is to provide an improved method of centering the metallic shell of a fluid sealing device in a mold the cavity of which is shaped to form an elastomeric sealing element and is closed off by the engagement of the mold parts with a bead formed in the metallic shell.

Another object of the invention is to provide a method of centering a beaded metallic shell on a mold part by registering the bead with a rib on the mold part, which method leaves the cylindrical wall of the shell free from engagement with the mold part.

Another object of the invention is to provide a method of molding elastomer sealing elements and bonding the same onto the beaded end wall of a metallic shell which includes clamping the end wall of the shell between planar surfaces on the mold parts under pressure sufficient to distort the bead and thereby reduce its axial height, which clamping pressure secures the shell in the mold parts causing it to close off the cavity in the mold parts during molding.

Another object of the invention is to provide a fluid seal having a metallic shell the end wall of which is annular and contains a bead spaced from the edge of the wall and in which that portion of the end wall between the bead and said edge is frusto-conical in shape and in which the elastomer sealing element is bonded to the frusto-conical portion of the end wall and to the adjacent face of the bead.

Another object of the invention is to provide a fluid seal that can be manufactured at low cost without sacrificing quality.

Further objects, not specifically mentioned here, will be apparent from the detailed description and claims which follow, reference being had to the accompanying drawings in which a preferred embodiment of the invention is shown by way of example and in which:

FIG. 1 is a cross-sectional view of a mold in open position with the shell of a seal registered with the lower mold part;

FIG. 2 is a cross-sectional view of the mold in molding position;

FIG. 3 is a plan view of a sealing device embodying the teachings of the invention;

FIG. 4 is a cross-sectional view taken along the line 4—4 of FIG. 3, looking in the direction of the arrows and drawn to an enlarged scale; and FIG. 5 is a view similar to FIG. 4 and showing a modified form of seal.

Sealing devices employed to form a fluid tight seal between a shaft and a bore in a housing through which the shaft projects, frequently consist of a metallic shell that has a cylindrical portion and an end wall projecting radially from one end of that portion. An elastomer sealing element is bonded to the end wall of the shell and terminates in sealing lip means disposed within the shell.

In order to meet the requirements of equipment manufacturers, seals of this type must be available in a plurality of different sizes. Shaft diameters vary over a considerable range and in addition the bore diameters also vary. A shaft of particular diameter may project through bores of varying diameters; consequently the sealing devices having sealing elements of correct dimension for the particular shaft size must be available in shells of several different diameters.

Heretofore molding of such sealing devices has been accomplished by centering the shell in the mold through engagement of the cylindrical wall of the shell with a guide wall in the mold. As a result, a mold containing a cavity of dimension correct for a particular shaft size has had to be equipped with a plurality of removable rings so that shells of different diameters could be centered properly in the mold. This fact has increased the cost of molds and required extra labor in setting up the mold for a particular sealing device since locating the proper interchangeable ring and securing the same properly in the mold has been required.

The present invention seeks to improve upon the prior art of which I am aware, by providing a sealing device which can be molded in a single mold notwithstanding that the diameter of the cylindrical wall of the shell varies appreciably. To this end I have provided a metallic shell having a cylindrical wall of desired diameter, from one end of which wall an end wall is projected radially. The end wall is provided with a bead indented in it and projected axially toward the other end of the cylindrical wall of the shell, which bead is concentric with and spaced from the cylindrical wall.

The mold containing the cavity correctly dimensioned for forming the desired seal contains a planar surface with which the free end of the bead is registered. Rising from this surface is a rib which registers with one side of the bead, with the result that the shell is properly located on the mold part. The mating mold part contains a flat surface that is brought into engagement with the end wall of the shell and the pressure applied to the mold parts is sufficiently high to distort the bead thereby reducing its axial height. The rib on the first mold part is brought into engagement with the underside of the end wall, and that portion of the end wall between the bead and the distal end of the wall is distorted and projected into the mold cavity formed in the mold parts.

As is customary, the shell is coated with a bonding agent prior to registration with the mold part, and when the cavity is filled with an uncured elastomeric material heat supplied to the mold in known manner and pressure applied to the material cures the material to form the sealing element of the device. The engagement of the bead and that portion of the end wall of the shell between the bead and the distal end of the end wall together close off the cavity in the mold part sufficiently tightly to prevent formation of flash at this point. Since the shell is centered in the mold part of the interengagement of the bead and rib, it is not necessary that the cylindrical wall of the shell be engaged by the mold and as a result a single mold can be used to form sealing devices the cylindrical walls of which vary over a considerable range.

Referring now to the drawings, in FIG. 1, I have shown a metallic shell having a cylindrical wall 10, from one end of which an end wall, indicated generally at 11, is projected radially. A bead 12 extends out of the end wall dividing the same into two portions, namely, an annulus 13 disposed between the bead and the cylindrical wall 10 and a second annulus 14 disposed between the bead and the distal end of the end wall. It will be noted that the upper face of the end wall portion 14 is disposed slightly above the upper face of the end wall portion 13. The first or lower mold part contains a flat surface 15 from one edge of which a rib 16 projects upwardly. With the shell registered with this mold part, it will be noted that the upper end of the rib 16 is spaced away from the lower side of the portion 13 of the end wall.

The mating member of the mold contains a flat surface 17 and, as will be seen in FIG. 2, when the mold parts are registered together this surface 17 is brought into engagement first with the upper surface of shell portion 14 and subsequently with the upper surface 13 on the end wall of the shell. The pressure applied to the mold parts is sufficient to move the wall portion 14 into alignment with the wall portion 13 and to reduce the axial height of the bead 12 and to distort the wall portion 14 from planar to frusto-conical configuration, as shown at 18. It will also be noted that the wall portion 13 of the shell is moved into engagement with the upper end of the rib 16.

The frusto-conical portion 18 thus formed is projected into the cavity formed in the mold parts, which cavity is closed by the engagement of the surface of wall portion 14 with the surface 17, and the engagement of the lower end of the bead 12 with surface 15.

The particular construction of other parts of the mold and the shape of the cavity therein and resulting shape of the sealing element formed thereby are not of the essence of the present invention. As shown, the sealing element contains lip means 20 consisting of a single lip of generally V-shaped configuration and containing a groove 21. The particular sealing element thus shown is shown by way of example, as other specific lip means, including but not limited to multi-lip seals, which can be molded in accordance with the teaching of the present invention and such variations in design are contemplated.

With the mold parts closed together and heat applied thereto in known manner, not shown, uncured elastomeric material introduced into the mold cavity will be cured by the heat in the mold parts and pressure on the material during molding. In the case of compression molding, a measured quantity of raw material will be placed in the cavity prior to closing of the mold, and the surfaces 22 will be provided with vents through which air in the mold can escape and excess material placed in the mold may also escape into a cavity 23 formed between the mold part in the usual manner.

It will be noted in FIG. 2 that with the mold part closed in molding position, the cylindrical wall 10 of the shell does not engage the lower mold part. As shown in dotted lines, shells having cylindrical walls of diameters indicated at **10*a* and 10*b*** may be registered with and clamped in the mold parts in the same manner as is the shell shown.

After the pressure has been maintained on the mold part during the interval required to cure the elastomeric material, the mold is opened by separating the parts thereof and the seal thus formed is retained on the lower mold part. A stripper plate 25 is operated upwardly in the usual manner to remove the product from the mold.

As will be seen in FIGS. 3 and 4, the seal so formed contains the outer cylindrical wall 10 the radially projecting end wall surfaces 13 and 14 of which lie in a common plane. The bead 12 projects inwardly of the sealing device and the sealing element encompasses both faces of the frusto-conical portion 18 of the shell and fills the generally V-shaped groove formed by the lower surface of the portion 18 and the adjacent side of the bead 12. It will be noted that the elastomer does not extend beyond the surface of portion 14, nor does it extend below the end of the bead 12. A garter spring 26 is disposed in the groove 21 and tensioned to urge the sealing lip 20 inwardly in the usual manner. The bead in the end wall of the shell of the device stiffens that wall thereby insuring proper positioning of the sealing lip with the cylindrical wall 10 of the device, even though the device be subject to substantial forces tending to distort it.

The sealing device shown in FIGS. 1 to 4, inclusive, is of the type wherein the cylinder 10 of the shell forms the outermost portion of the device and the apex of the sealing lip 20 the innermost portion thereof. The teachings of the present invention are not limited to this particular type of device but rather are equally applicable to devices of the type shown in FIG. 5, wherein the cylindrical wall **10*c* forms the innermost limit of the device and the lip portion 20*a* the outermost portion thereof. The garter spring 26*a* in a seal of this type is tensioned to urge the sealing lip 20 outwardly into engagement with a bore surface to form a seal therewith. The end wall of the seal is provided with a bead 12*a*** and during molding this bead is registered with a planar surface and a rib on the mold part and subsequently deformed by pressure applied between the mating mold parts in the hereinbefore described manner.

From the foregoing, it will be apparent that by providing a beaded end wall on the metallic shell of the sealing device and equipping mold parts with a planar surface and rib with which the bead is registered, I am able to properly center the shell in a mold, notwithstanding that the cylindrical wall of the shell is spaced an appreciable distance from the mold part. By applying to the mold parts pressure sufficient to distort the bead, I am able to clamp the shell in the mold sufficiently tightly to enable proper molding of the elastomer sealing element. Thus molding costs are reduced first by simplification of the mold parts brought about through the elimination of the various rings heretofore necessary to permit molding seals of different OD's in a single mold, and further by eliminating flash so that the minimum quantity of the relatively expensive elastomeric material is all that is required. Sealing devices made in accordance with the teachings of the present invention are rugged and capable of maintaining seal for long periods of time, even under conditions of rough usage to which the devices are sometimes subjected.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. The method of molding the sealing lip of a shaft seal and simultaneously bonding the lip to the innermost portion of the radial wall of a metallic shell which portion is separated from an outermost portion of the wall by an axially extending bead, which method comprises:

applying opposing pressures to the axial end of the bead and the upper surface of said innermost wall portion;

holding the outer sidewall of said bead against distortion as said pressures are increased sufficiently to reduce the axial height of the bead and to distort said innermost wall portion out of planar and into frusto-conical shape;

simultaneously forcing uncured elastomeric material into engagement with the exposed surfaces of said frusto-conical portion and the inner surface of said bead;

and maintaining said pressures to bond said material to said surfaces and to cure the material.

2. The method of molding the sealing lip of a shaft seal in complementary mold parts, which between them define a cavity, and simultaneously bonding the lip to the innermost portion of the radial wall of a metallic shell which portion is separated from the outermost portion of the wall by an axially extending bead, which method comprises:

applying to the axial end of said bead and the upper surface of said innermost portion opposed pressures sufficient to reduce the axial height of said bead;

holding the outer surface of said bead against displacement to cause said pressures to distort said innermost portion from planar to frusto-conical form and to project the same into the cavity closed by said shell parts;

simultaneously forcing uncured elastomeric material into engagement with said frusto-conical wall portion and the inner surface of said bead;

and maintaining said pressure to bond the sealing lip to the shell and to cure the elastomeric material in said lip.

3. The method of molding, in complementary mold parts, the sealing lip of a shaft seal and simultaneously bonding the lip to the innermost portion of the radial wall of a metallic shell which portion is separated from the outermost portion of the wall by an axially extending bead, which method comprises:

centering and supporting the shell on one mold part by engaging the axial end and the outer surface of the bead with the mold part;

moving the other mold part into engagement with said innermost wall portion;

supplying pressure between said mold parts sufficient to reduce the axial height of said bead and to deform said inner wall portion into frusto-conical shape;

simultaneously forcing uncured elastomeric material into engagement with said frusto-conical wall portion, and the inner surface of said bead;

and maintaining said pressure to bond the sealing lip to the shell and to cure the elastomeric material therein.

References Cited in the file of this patent

UNITED STATES PATENTS

| | | |
|---|---|---|
| 2,471,679 | Gardner | May 31, 1949 |
| 2,483,988 | Victor | Oct. 4, 1949 |
| 2,982,999 | Stewart | May 9, 1961 |
| 3,004,298 | Haynie | Oct. 17, 1961 |
| 3,059,278 | Daniel | Oct. 23, 1962 |
| 3,095,610 | Sawyer | July 2, 1963 |